US011753508B2

(12) United States Patent
Ferrari et al.

(10) Patent No.: US 11,753,508 B2
(45) Date of Patent: Sep. 12, 2023

(54) TREATMENT OF POLYMER PARTICLES

(71) Applicant: Cambridge Enterprise Limited, Cambridge (GB)

(72) Inventors: Andrea Carlo Ferrari, Cambridge (GB); Stephen Anthony Hodge, Cambridge (GB); Panagiotis Karagiannidis, Cambridge (GB); Yue Lin, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 443 days.

(21) Appl. No.: 16/649,055

(22) PCT Filed: Sep. 21, 2018

(86) PCT No.: PCT/EP2018/075676
§ 371 (c)(1),
(2) Date: Mar. 19, 2020

(87) PCT Pub. No.: WO2019/057928
PCT Pub. Date: Mar. 28, 2019

(65) Prior Publication Data
US 2020/0291192 A1    Sep. 17, 2020

(30) Foreign Application Priority Data
Sep. 22, 2017  (GB) ..................... 1715387

(51) Int. Cl.
*C08J 3/12* (2006.01)
*C08K 3/04* (2006.01)
*C08J 3/02* (2006.01)
*C08J 3/215* (2006.01)
*C08J 3/20* (2006.01)
*C01B 19/00* (2006.01)

(52) U.S. Cl.
CPC . *C08J 3/12* (2013.01); *C08J 3/02* (2013.01); *C08J 3/20* (2013.01); *C08J 3/215* (2013.01); *C08K 3/042* (2017.05); *C01B 19/00* (2013.01); *C01B 19/007* (2013.01); *C08J 2300/22* (2013.01); *C08J 2377/02* (2013.01); *C08K 2201/011* (2013.01)

(58) Field of Classification Search
CPC ....... C08J 3/02; C08J 3/12; C08J 3/215; C08J 2377/02; C08K 3/042; C08K 2201/011
See application file for complete search history.

(56) References Cited

U.S. PATENT DOCUMENTS

| 2004/0043964 | A1 | 3/2004 | Gomi et al. |
| 2010/0247908 | A1 | 9/2010 | Velev et al. |
| 2014/0255785 | A1 | 9/2014 | Do et al. |
| 2017/0036914 | A1 | 2/2017 | Sohn et al. |
| 2017/0253702 | A1 | 9/2017 | Ma et al. |

FOREIGN PATENT DOCUMENTS

| CN | 106589412 | 4/2017 |
| GB | 2535887 | 8/2016 |
| WO | WO2010035092 | 4/2010 |
| WO | WO2014062226 | 4/2014 |
| WO | WO2014064432 | 5/2014 |
| WO | WO2016057369 | 4/2016 |
| WO | WO2017007953 | 1/2017 |
| WO | WO2017013263 | 1/2017 |
| WO | WO2017019511 | 2/2017 |
| WO | WO 2017/060497 | 4/2017 |
| WO | WO2017154533 | 3/2018 |

OTHER PUBLICATIONS

Tkalya et al., (2010) "Latex-based Concept for the Preparation of Graphene-based Polymer Nanocomposites", Journal of Materials Chemistry 20(15):3035-3039.
Zang et al., (2015) "Enhanced Mechanical and Electrical Properties of Nylon-6 Composite by using Carbon Fiber/Graphene", Journal of Applied Polymer Science 132 (41968):10 pages.
Bao et al., (2012) "Preparation of graphene by pressurized oxidation and multiplex reduction and its polymer nanocomposites by masterbatch-based melt blending," Journal of Materials Chemistry, 22: 6088-6096.
Bianco et al., (2013) "All in the graphene family—A recommended nomenclature for two-dimensional carbon materials," Elsevier, Carbon 1-6.
Bryning et al., (2005) "Thermal conductivity and interfacial resistance in single-wall carbon nanotube epoxy composites," Appl. Phys. Lett. 87: 161909 4 pages.
Chen et al., (2010) "Nanowire-in-Microtube Structured Core/Shell Fibers via Multifluidic Coaxial Electrospinning," Langmuir Article, 26(13): 11291-11296.
Chen et al., (2013) "Nanowire-based gas sensors," Elsevier, Sensors and Actuators B: Chemical, 177 178-195.

(Continued)

*Primary Examiner* — Edward J Cain
(74) *Attorney, Agent, or Firm* — Rudy James Ng; Bozicevic, Field & Francis LLP

(57) ABSTRACT

A method for treating polymer particles is disclosed. Polymer particles and a liquid are provided. The method includes the following steps (a) and (b). (a) Mixing said polymer particles with said carrier liquid to form a dispersion of said particles in said carrier liquid at a concentration of at least 0.1 g/L, based on the volume of the dispersion. (b) Subjecting the dispersion to microfluidization treatment thereby causing particle stretching, particle size reduction and increasing the surface area per unit mass of the polymer particles. Also disclosed is a particulate composition comprising polymer particles mixed with nanoplates derived from a layered material, wherein the particulate composition has a BET surface area of at least 10 $m^2/g$. Furthermore, there is disclosed a method for the manufacture of a component formed of a composite of a polymer with a dispersion of nanoplates. The particulate composition is provided as a precursor particulate. Then the precursor particulate is formed into the component.

17 Claims, 11 Drawing Sheets

(56) References Cited

OTHER PUBLICATIONS

Choi et al., (2011) "Fabrication of Conducting Polymer Nanowires," Nanowires-Implementations and Applications, www.Intechopen.com 19 pages.

Ferrari et al., (2015) "Science and technology roadmap for graphene, related two-dimensional crystals, and hybrid systems," Nanoscale, 7(11): 4587-5062.

Jafari et al., (2007) "Production of sub-micron emulsions by ultrasound and microfluidization techniques," Journal of Food Engineering, 82: 478-488.

Karagiannidis et al., (2017) "Microfluidization of Graphite and Formulation of Graphene-Based Conductive Inks," ACS Nano, 11:2724-2755.

Kim et al., (2011) "Graphene/polyethylene nanocomposites: Effect of polyethylene functionalization and blending methods," Elsevier, Polymer, 52: 1837-1846.

Lajunen et al., (2014) "Topical drug delivery to retinal pigment epithelium with microfluidizer produced small liposomes," Elsevier, European Journal of Pharmaceutical Sciences 62: 23-32.

Launder & Spalding (1974) "The Numerical Computation of Turbulent Flows," Computer Methods in Applied Mechanics and Engineering 3, 269-289.

Li and Zhong (2011) "Review on polymer/graphite nanoplatelet nanocomposites," J. Mater Sci 46:5595-5614.

Liu et al., (2004) "Polymeric Nanowire Chemical Sensor," Nano Letters, 4(4): 671-675.

Martin (1994) "Nanomaterials: A Membrane-Based Synthetic Approach," Science 266: 1961-1966.

Young Min (2012) "Large-scale organic nanowire lithography and electronics," Article, nature communications, 1-9.

Young Min (2015) "Organic Nanowire Fabrication and Device Applications," Small, 11(1): 45-62.

Panagiotou et al., (2008) "Deagglomeration and Dispersion of Carbon Nanotubes Using Microfluidizer High Shear Fluid Processors," ResearchGate 1: 39-42.

Paton et al., (2014) "Scalable production of large quantities of defect-free few-layer graphene by shear exfoliation in liquids," Nature Materials, 13: 624-630.

Shen et al., (2016) "Multilayer Graphene Enables Higher Efficiency in Improving Thermal Conductivities of Graphene/Epoxy Composites," Nano Letters, 16: 3585-3593.

Shi et al., (2007) "Surfactant-Free Method for Synthesis of Poly (vinyl acetate) Masterbatch Nanocomposites as a Route to Ethylene Vinyl Acetate/ Silicate Nanocomposites," Chem. Mater, 19: 1552-1564.

Verdejo et al., (2011) "Graphene filled polymer nanocomposites," Journal of Materials Chemistry, 21: 3301-3310.

Wan et al., (2013) "Improved dispersion and interface in the graphene/epoxy composites via a facile surfactant-assisted process," Elesvier, Composites Science and Technology, 82: 60-68.

Wang et al., (2014) "Conducting Polymer Nanowire Arrays for High Performance Supercapacitors," Small, 10(1): 14-31.

Xin et al., (2010) "Polymer Nanowire/Fullerene Bulk Heterojunction Solar Cells: How Nanostructure Determines Photovoltaic Properties," ACSNano, Article, 4(4): 1861-1872.

Young et al., (2012) "The mechanics of graphene nanocomposites: A review" Elsevier, Composites Science and Technology, 72, 1459-1476.

Zhou et al., (2013) "Construction of High-Capacitance 3D CoO@Polypyrrole Nanowire Array Electrode for Aqueous Asymmetric Supercapacitor," Nano letters, 13, 2078-2085.

GB1715387.5, GB Search Report dated Oct. 5, 2018 3 pages.

GB1715387.5, GB Search Report dated Mar. 22, 2018 5 pages.

PCT/EP2018/075676 International Search Report dated Feb. 13, 2019 16 pages.

CN201880075588.3 First Office Action dated Oct. 13, 2022, 11 pages and English translation 6 pages.

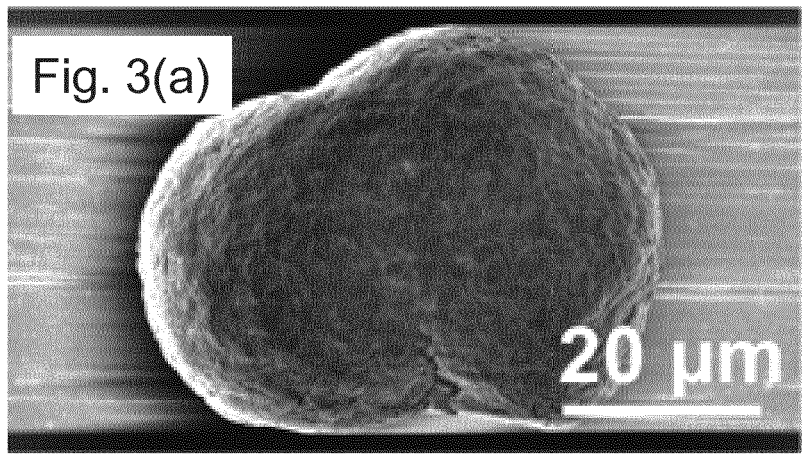
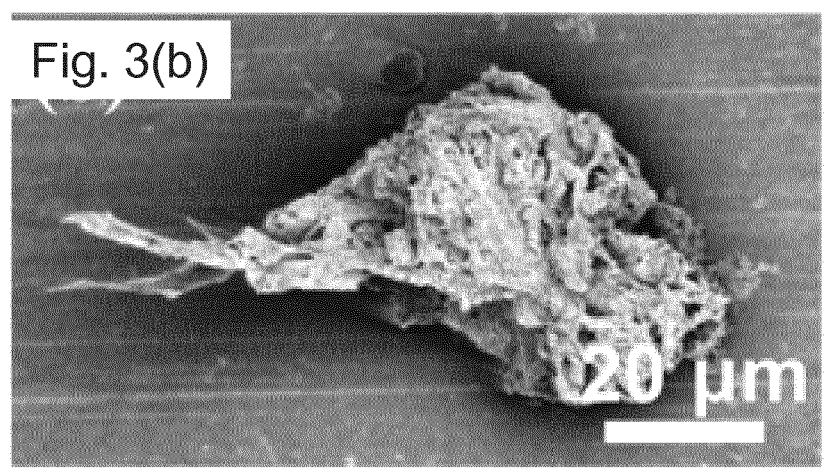
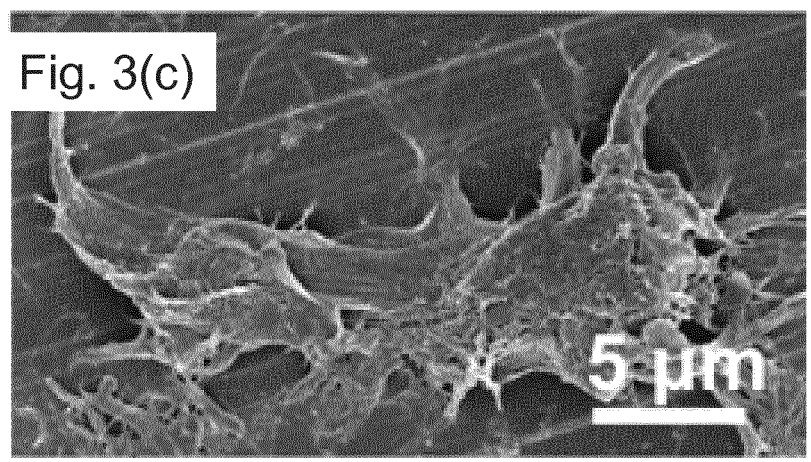

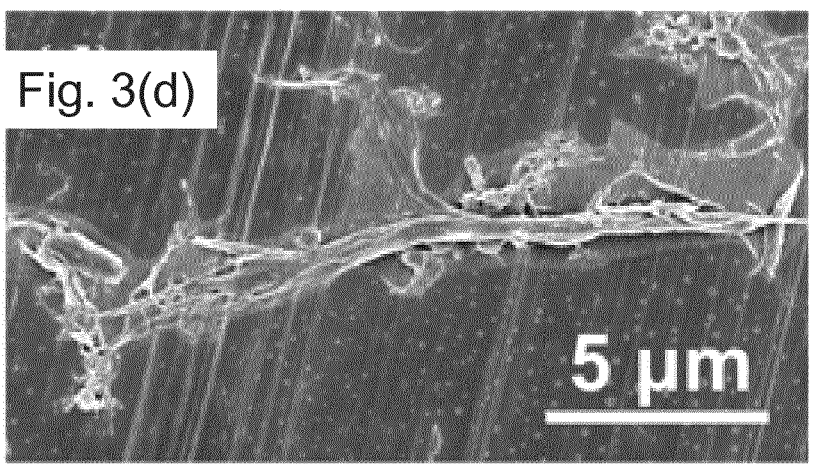
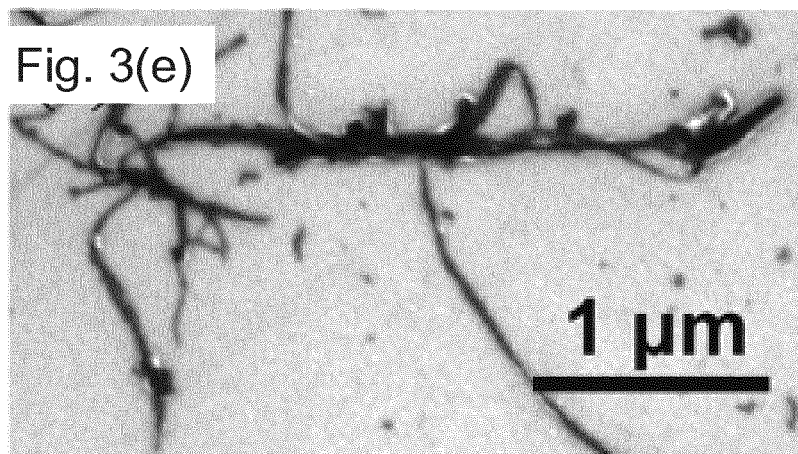

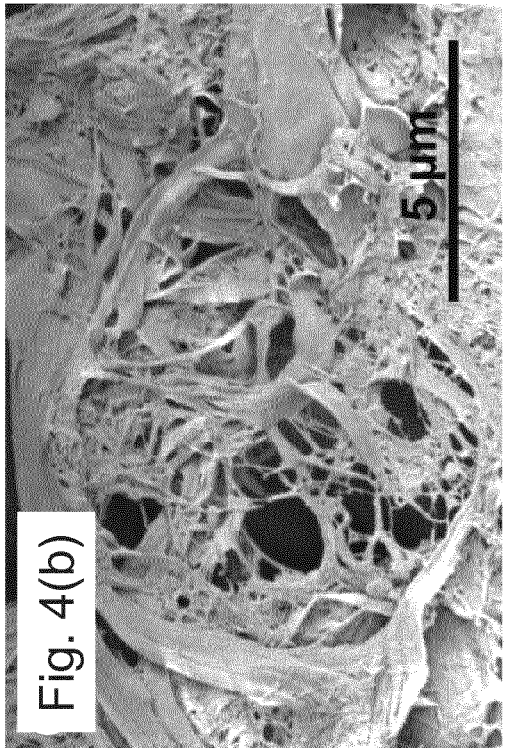
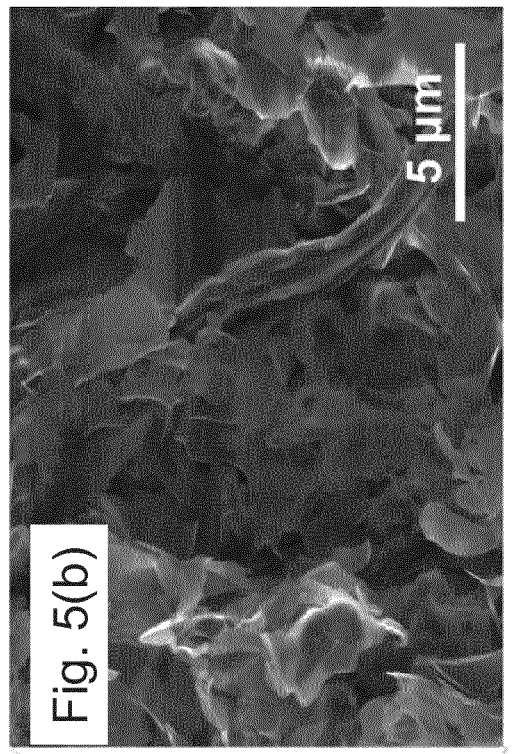
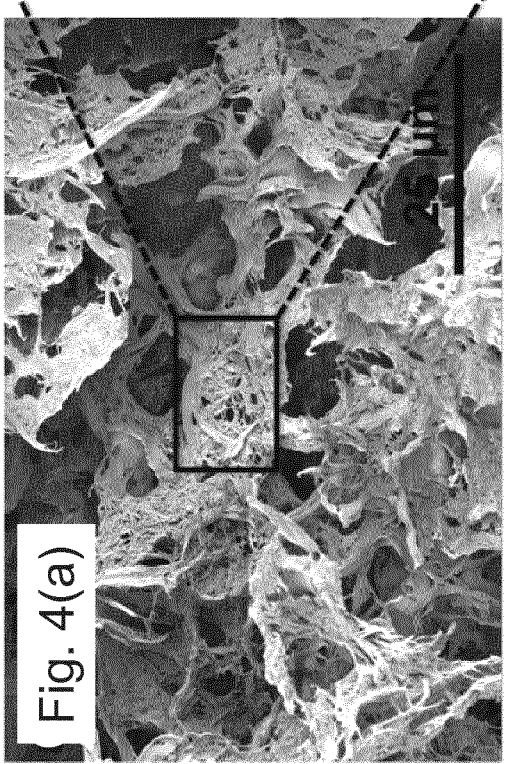
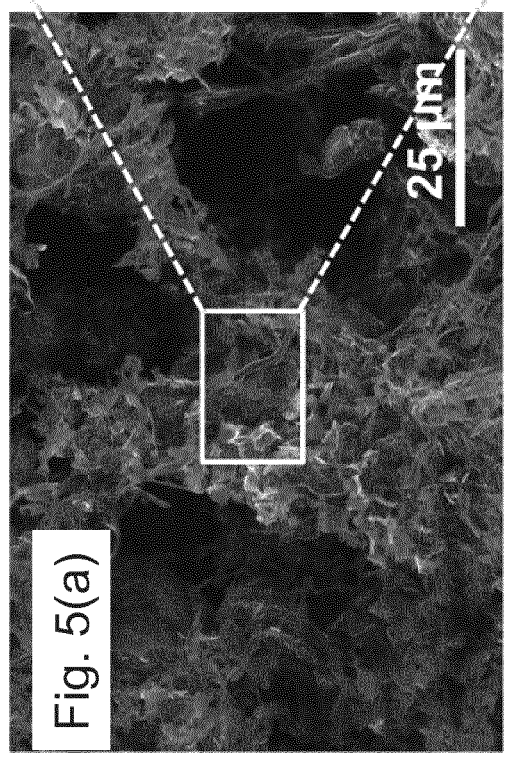

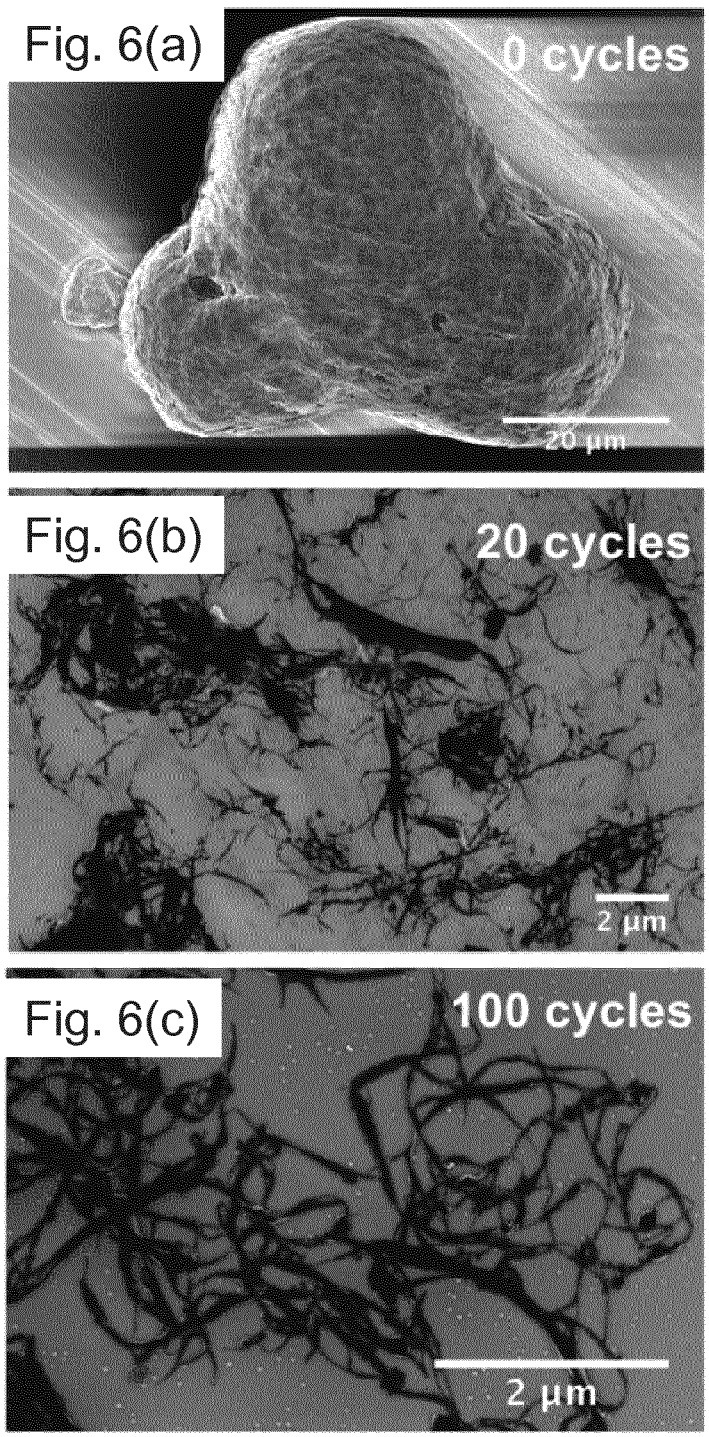

TREATMENT OF POLYMER PARTICLES

BACKGROUND TO THE INVENTION

Field of the Invention

The present invention relates to methods for the treatment polymer particles and to compositions comprising treated polymer particles. The polymer particles may comprise thermoplastic polymer particles. Additionally or alternatively the polymer particles may comprise thermoset polymer particles. Such methods and compositions are proposed for various uses and applications. Of particular, but not exclusive, interest are polymer nanowires and methods for their manufacture.

Related Art

Polymer nanowire (PNW) is a promising one-dimensional material in many applications, such as energy storage [Ref. 1], energy harvesting [Ref. 2], sensors [Ref. 3], optoelectronics [Ref. 4], and wearable electronics [Ref. 5]. PNWs can be synthesized by some known methods, such as nanopore templating [Ref. 6], electro-spinning [Ref. 7], electrochemical polymerization [Ref. 8], and nanolithography [Ref. 9]. Although PNWs demonstrate significant potential, the lack of a fabrication method with a suitably low cost and high yield limits their commercialization and future applications [Ref. 10].

SUMMARY OF THE INVENTION

The present invention has been devised in order to address at least one of the above problems. Preferably, the present invention reduces, ameliorates, avoids or overcomes at least one of the above problems.

Part of the insight of the present inventors is that microfluidization, surprisingly, provides a suitable approach for the manufacture of polymer nanowires (PNWs). A "nanowire" can be understood in the context of the present disclosure as a high aspect ratio structure (e.g. length/thickness>10) with typical diameter<1000 nm. More preferably, the aspect ratio is greater than 100, or greater than 1000. In some cases, the length of the nanowire may be >10 μm. However, nanowires of length less than 10 μm are also contemplated.

Microfluidization has been applied in several commercial applications. For example, liposome nanoparticles used in eye drops [Ref. 11] are produced by using microfluidization, as well as oil-in-water nanoemulsions [Ref. 12] used in food applications. Microfluidization has also been used for the deagglomeration of carbon nanotubes [Ref. 13] and production of graphene [Ref. 14]. Previous work on the use of microfluidization for the production of graphene from the inventors' research group is disclosed in WO 2017/060497, the content of which is hereby incorporated in its entirety.

Accordingly, in a first preferred aspect, the present invention provides a method for treating polymer particles, the method including providing polymer particles and providing a carrier liquid, the method further including the steps:

(a) mixing said polymer particles with said carrier liquid to form a dispersion of said particles in said carrier liquid at a concentration of at least 0.1 g/L, based on the volume of the dispersion; and (b) subjecting the dispersion to microfluidization treatment thereby causing particle stretching, particle size reduction and increasing the surface area per unit mass of the polymer particles.

In a second preferred aspect, the present invention provides a particulate composition comprising polymer particles mixed with nanomaterials, for example nanoplates derived from a layered material, wherein the particulate composition has a BET surface area of at least 10 m$^2$/g.

In a third preferred aspect, the present invention provides a functional ink comprising the particulate composition according to the second aspect and a carrier liquid. For example, a product of the first aspect of the invention may be a functional ink according to this third aspect. Such an ink may be printed/coated using many different techniques (e.g. inkjet, screen, flexo, gravure printing, spin and spray coating) for applications such as sensors, field effect transistors (FETs) or thermal interface materials.

In a fourth preferred aspect, the present invention provides a method for the manufacture of a component formed of a compound of a polymer with a dispersion of nanoplates, the method including the steps:

providing a particulate composition according to the second aspect as a precursor particulate; and forming the precursor particulate into the component.

The forming may be carried out by melt-forming. Melt-forming may be carried out by melting, partially melting or softening the precursor particulate for moulding or other plastics shaping. For example, melt-forming may be carried out by melt extrusion. Alternatively, melt-forming may be carried out by injection moulding. A further alternative is for forming to be carried out by compression moulding. Still further, the component may be formed by 3-D printing of the precursor particulate.

In a fifth preferred aspect, the present invention provides a method for the manufacture of a composition comprising polymer particles mixed with nanoplates derived from a layered material, the method including carrying out the method of the first aspect and subsequently removing the carrier liquid.

The first, second, third, fourth and/or fifth aspect of the invention may have any one or, to the extent that they are compatible, any combination of the following optional features.

The dispersion of the polymer particles in the carrier liquid may have a concentration of polymer particles of at least 0.5 g/L, based on the volume of the dispersion. More preferably, the concentration of polymer particles is at least 1 g/L, more preferably at least 5 g/L, more preferably at least 10 g/L, based on the volume of the dispersion. The dispersion of the polymer particles in the carrier liquid may have a concentration of polymer particles of not more than 500 g/L, more preferably not more than 200 g/L, based on the volume of the dispersion. It is considered that at concentrations more than 500 g/L, or in some cases at concentrations more than 200 g/L, the viscosity of the dispersion becomes high and the resultant shear rate in the microfluidizer becomes too low.

In the microfluidization treatment of step (b), it is possible to consider preferred conditions for microfluidization. Step (b) may be subdivided into steps (b(i)) and (b(ii)) as follows:

(b(i)) pressurizing the dispersion to a pressure; and (b(ii)) forcing the dispersion along a microfluidic channel under said pressure, to apply a shear rate to said particles in the dispersion, thereby causing particle stretching, particle size reduction and increasing the surface area per unit mass of the polymer particles.

In step (b(i)) the dispersion may be pressurized to a pressure of at least 10 kpsi.

Preferably, the dispersion is pressurised to a pressure of at least 15 kpsi. More preferably, the dispersion is pressurised to a pressure of at least 20 kpsi, at least 25 kpsi or at least 30 kpsi. It is found that using too low a pressure leads to insufficient deformation of the particles. Additionally, when a layered material is added (see below), too low a pressure can lead to insufficient exfoliation. The pressure can be generated and measured in a known manner, for example using an intensifier pump along a flow line, between a reservoir holding the dispersion of particles in the carrier liquid and the microfluidic channel.

An explanation is now provided of the shear rate applied in the preferred embodiments of the invention. The Reynolds number (Re) is a parameter that can be used to determine the type of flow inside the microchannel of the microfluidizer, given by pUD/μ, where ρ is the liquid density (which for water is 1000 kg/m$^3$, U is the mean channel velocity (calculated at about 300 m/s), D the pipe diameter (87 um for a G10Z microchannel used in the preferred embodiments) and μ is the dynamic viscosity ($1\times10^{-3}$ N s/m$^2$). The calculated Reynolds number, $2.6\times10^4$, indicates that there is fully developed turbulent flow inside the microchannel (Re>>4000). The turbulent shear rate can be estimated by the equation $\dot{\gamma}=(\varepsilon/v)^{1/2}$ where ε is the turbulent energy dissipation rate ($1\times10^{10}$ W/kg or m$^2$/s$^3$) and v the kinematic viscosity ($1\times10^{-6}$ m$^2$/s). The turbulent energy dissipation rate is determined by computational fluid dynamics (CFD) simulations. Determination of the turbulent energy dissipation rate is discussed, for example, in Launder and Spalding (1974) and by Chakraborty (2012), and may be determined for a particular microfluidic channel following the guidance disclosed in those references. The computed mean turbulent shear rate inside the microchannel used in the preferred embodiments is $1\times10^8$ s$^{-1}$, which is 4 orders of magnitude higher than the minimum shear rate required to initiate graphite exfoliation [Paton (2014)]. Thus, the stretching and deformation of the polymer particle, and the exfoliation of the graphite flakes, is considered to be primarily due to shear and stress generated by the microfluidic processor. Such shear rates can be applied by probe sonicators or shear mixers only in the vicinity of the probe or the rotor-stator but cannot be applied in the entire batch uniformly. In contrast, forcing the dispersion along the microfluidic channel in the present invention allows suitable shear rates to be applied uniformly to the entire batch of the dispersion. One point to note is that as the microfluidization process proceeds (e.g. through multiple cycles), the flow may become more uniform and may become laminar. However, even under such conditions it is possible to observe that the polymer particles stretch and deform.

In step (b(ii)) the shear rate applied to the particles in the dispersion may be at least $10^5$ s$^{-1}$. Preferably, the shear rate applied to the particles in the dispersion is at least $5\times10^5$ s$^{-1}$. More preferably, the shear rate applied to the particles in the dispersion is at least $10^6$ s$^{-1}$, at least $5\times10^6$ s$^{-1}$, or at least $10^7$ s$^{-1}$.

The treated polymer particles, and/or the particulate composition, may have a BET surface area of at least 20 m$^2$/g, at least 30 m$^2$/g, at least 40 m$^2$/g, at least 50 m$^2$/g, at least 60 m$^2$/g, at least 70 m$^2$/g, at least 80 m$^2$/g, at least 90 m$^2$/g, at least 100 m$^2$/g, at least 120 m$^2$/g, at least 140 m$^2$/g, at least 160 m$^2$/g, at least 180 m$^2$/g, at least 200 m$^2$/g, at least 250 m$^2$/g, at least 300 m$^2$/g, at least 350 m$^2$/g, at least 400 m$^2$/g, at least 450 m$^2$/g, or at least 500 m$^2$/g.

In some embodiments, the method may further include the step of adding particles of a layered material to the dispersion. In this way, the microfluidization treatment can cause exfoliation of nanoplates from said particles. Alternatively, the method may include the step of adding particles of an agglomeration of nanoforms to the dispersion. Such nanoforms may for example be nanoparticles, nanotubes, etc. The intention here is that the microfluidization process assists in de-agglomerating and dispersing the nanoforms to provide a dispersion of the nanoforms in the dispersion.

Additionally or alternatively, there may further be included the step of adding nanoplates derived from a layered material to the dispersion. For example, the nanoplates may be added to the dispersion before step (b). Alternatively, the nanoplates may be added to the dispersion after step (b). More generally, there may be added nanoforms as discussed above.

The nanoplates may be selected from one or more of elemental materials such as graphene (typically derived from pristine graphite), metals (e.g., NiTe$_2$, VSe$_2$), semimetals (e.g., WTe$_2$, TcS$_2$), semiconductors (e.g., WS$_2$, WSe$_2$, MoS$_2$, MoTe$_2$, TaS$_2$, RhTe$_2$, PdTe$_2$), insulators (e.g., h-BN, HfS$_2$), superconductors (e.g., NbS$_2$, NbSe$_2$, NbTe$_2$, TaSe$_2$) and topological insulators and thermo-electrics (e.g., Bi$_2$Se$_3$, Bi$_2$Te$_3$).

For example, the layered material may be graphite and the nanoplates may be graphite nanoplates.

For example, the layered material may be pristine graphite and the nanoplates may be graphite nanoplates.

The present invention builds on the work reported in WO 2014/064432 and WO 2017/060497, in which the production of graphite nanoplates materials is disclosed. In this disclosure, the term "nanoplates" is used based on the proposed nomenclature of Bianco et al (2013). The expression "single/few layer graphene" is also used, to identify graphene materials typically having 10 or fewer layers (measured by AFM this corresponds to a thickness of 5 nm or less or 4 nm or less).

A "nanoplate" is defined herein as a high aspect ratio structure (i.e. length/thickness>10) with typical thickness<100 nm and length>500 nm.

Taking the exfoliation of graphite as an example, it is found that the minimum pressure to exfoliate graphite to graphite nanoplates depends to some extent on the graphite particle size and concentration, and so routine experimentation can be carried out to assess the suitable operating pressure based on these parameters. For example, where high graphite loadings are used (e.g. 50-100 g/L), a pressure of at least 15 kpsi is suitable.

Lower pressures can be used to exfoliate graphite to graphite nanoplates for lower graphite loadings (e.g. <10 g/L). However, it should be noted that these lower concentrations are not preferred for applications where high concentration of nanoplates is required. For example, for some applications, the loading of graphite nanoplates should be higher than 30 g/L (i.e. 3% wt).

Where it is desired to form nanoplates with a very small thickness (e.g. single/few layers graphene, less than 10 layers thick), to achieve useful concentrations of single/few layers graphene (>0.1 g/L) with low graphite loadings (<10 g/L), a pressure of at least 30 kpsi may be needed with a large number of processing cycles (at least 100 processing cycles—see below). However, higher starting graphite loadings at lower pressures and a lower number of processing cycles will also produce useful concentrations.

It is preferred that the layered material is present in the carrier liquid in an amount of at least 10 g/L of dispersion. Note that the amount of layered material here is expressed in terms of mass per unit volume of the dispersion, the dispersion including the carrier liquid and the layered material. This distinction becomes particularly significant at high loading amounts of layered material. More preferably, the layered material is present in the carrier liquid in an amount of at least 20 g/L of dispersion, at least 30 g/L of dispersion, at least 40 g/L of dispersion, at least 50 g/L of dispersion, at least 60 g/L of dispersion, at least 70 g/L of dispersion, at least 80 g/L of dispersion or at least 90 g/L of dispersion. Typically, for example, the layered material is present in the carrier liquid in an amount 100 g/L of dispersion. Higher loading amounts are preferred in order to generate high concentrations of nanoplates in the dispersion. Higher loading amounts provide greater utility, for example in the case of conductive inks, because this reduces or avoids the need to remove any of the carrier liquid by a subsequent concentration or filtration step.

Preferably, the method produces a concentration of nanoplates in the dispersion of at least 0.1 g/L of dispersion. More preferably, the method produces a concentration of nanoplates in the dispersion of at least 0.5 g/L of dispersion, at least 1 g/L of dispersion, at least 2 g/L of dispersion, at least 5 g/L of dispersion, or at least 10 g/L of dispersion. Concentrations of about 80 g/L of dispersion are produced without difficulty, for example.

The dispersion subjected to step (b) may be subjected to steps (b(i)) and (b(ii)) repeatedly. This may be either via the same or different microfluidic channels. This repetition is carried out according to a number of cycles, wherein the number of cycles is at least 2.

The particles of the layered material may be added after at least one cycle of steps (b(i)) and (b(ii)).

The dispersion including the nanoplates may be subjected to at least one further cycle of steps (b(i)) and (b(ii)).

Preferably, the number of cycles is at least 5. The number of cycles may be higher, for example at least 10, at least 20 or at least 50. About 100 cycles may be particularly suitable in some embodiments. Preferably, the dispersion is subjected to a residence time in the microfluidic channel in step (b(ii)) for a time of up to 1 second, per cycle. More preferably, the dispersion is subjected to step (b(ii)) for a time of up to 0.5 second, per cycle. Still more preferably, the dispersion is subjected to step (b(ii)) for a time of up to 0.2 second, up to 0.1 second, up to 0.01 second, up to 0.005 second, or up to 0.001 second, per cycle. The dispersion may be subjected to step (b(ii)) for a cumulative time of up to 200 seconds, for example.

Microfluidic processing is utilized in pharmaceutical and food industry due to fact that it can have the same results as homogenizers but at a smaller number of passes. Too many processing cycles e.g. above 20, are not usually considered in the industries which use microfluidization processing. In the preferred embodiments of the present invention, the layered material particles are processed for a limited amount of time (in some cases for a time of only about $10^{-4}$ second, per cycle [Jafari et al (2007)]) as they pass along the microfluidic channel. Increasing the number of passes increase the exposure time of the material to the energy of the system. Thus high shear is effective for efficient particle deformation and/or exfoliation in such a short period of time (30 kpsi corresponds to a shear rate of $>10^8$ s$^{-1}$ for a G10Z chamber (microfluidic channel). However energy dissipation is much better controlled and consistent shear gives repeatable batch-to-batch results in comparison to other techniques.

An auxiliary processing module can be placed upstream of the microfluidic channel to assist in a pre-process of the sample before it enters the smaller geometry chamber or in line downstream of the chamber to add backpressure. Further details of the features of the apparatus can be seen at http://www.microfluidicscorp.com/microfluidizer-processors/m-110p [accessed 10 Aug. 2015] and from the Microfluidics Corp M-110P user guide.

In microfluidization it can be assumed that the energy density EN (J/m$^3$) is equal to the pressure differential due to low volumes and very short residence times in the microchannel [Jafari et al (2007)]. Therefore, for processing pressure 30 kpsi, E/V=207 MPa=2.07×10$^8$ J/m$^3$. This is high value of total energy input per unit volume. Scaling up microfluidic processing is easily achieved by increasing the flow rate, Q, thus, decreasing the time required to process a given volume, V, for n cycles (Q=nV/t). Thus, the production rate increases (Pr=CQ/n). Large scale microfluidizers can achieve flow rates as high as 12 L/min. Industrial system can be scaled. The present invention therefore provides a readily-scalable process suitable for industrial-scale manufacture of PNW with or without layered materials.

Preferably, the microfluidic channel has a transverse dimension (e.g. diameter) in the range 1-1000 μm. More preferably, the microfluidic channel has a transverse dimension (e.g. diameter) of at most 300 μm. The microfluidic channel preferably has a transverse dimension (e.g. diameter) of at least 50 μm. These dimensions allow a suitably high shear rate along with acceptable flow rates. Preferably, the microfluidic channel is substantially equi-axed. For example, the cross sectional shape of the microfluidic channel may be circular, oval, square or near-square.

Preferably, the microfluidic channel provides a tortuous flow path. However, it is preferred that the microfluidic channel does not have flow splitting paths or flow recombination paths. In the field of microfluidic processing, microfluidic channels with flow splitting paths and/or flow recombination paths are referred to as Y-type channels. In contrast, the preferred embodiments of the present invention use Z-type channels, to refer to the tortuous flow path but absence of flow splitting paths and flow recombination paths.

Preferably, the carrier liquid is aqueous. This is particularly convenient for low-cost, environmentally friendly processing, and also provides compatibility with water-based ink formulations.

More generally, the carrier liquid may be selected from one or more of water, alcohols (e.g. ethanol, iso-propanol), ethers, esters, amides (DMF, NMP, CHP, DMEU), amines (e.g. hexylamine), halogenated (e.g. chloroform, dichlorobenzene), carbon disulphide, carbonates (e.g. ethylene carbonate, propylene carbonate), hydrocarbons (e.g. hexane, benzene, toluene), or neat liquid monomers or polymers (e.g. polyacrylates, epoxies, polysilanes), in particular for composite inks. Preferably, the carrier liquid is selected from one or more of water, alcohol, N-methylpyrrolidone, chloroform, benzene, toluene, di-chlorobenzene, iso-propyl alcohol, ethanol and/or other organic solvents. Most preferably, the carrier liquid includes an amide. In general, it will be understood that preferably the carrier liquid does not include a component that dissolves the polymer particles.

The dispersion may include one of more stabilising agents. Suitable stabilising agents may be polymers or surfactants (anionic, cationic, non-ionic, Zwitterionic, bio-surfactants, etc.).

In the particulate composition, it is preferred that the nanoplates are present in an amount of at least 0.1 wt % based on the mass of the particulate composition. More preferably, the nanoplates are present in an amount of at least 0.5 wt %, at least 1 wt %, at least 2 wt %, at least 3 wt %, at least 4 wt %, at least 5 wt %, at least 6 wt %, at least 7 wt %, at least 8 wt %, at least 9 wt %, or at least 10 wt %, based on the mass of the particulate composition. For a masterbatch composition, the nanoplates may for example present in an amount of at least 15 wt %, at least 20 wt %, at least 25 wt %, or at least 50 wt %, based on the mass of the particulate composition.

The polymer particles may comprise thermoplastic polymer particles. Additionally or alternatively the polymer particles may comprise thermoset polymer particles. Suitable polymers for use with the present invention include polyethylene, polyamide, polyether ether ketone (PEEK), polyaniline, PEDOT:PSS. The polymer particles may comprise elastomer polymer particles. For example the polymer particles may comprise one or more natural or synthetic rubber elastomers.

In the fourth aspect of the invention, there may be further included the step of mixing the particulate composition with a further material to form the precursor particulate. The further material may be any suitable material, such as a polymer (e.g. the same or different polymer), ceramic, etc. Where the further material is a polymer, the particulate composition may be considered to be a masterbatch which is subsequently diluted with additional polymer. In this way, the masterbatch may be formed with a fixed concentration of layered material, and then used to form a final component with a desired (lower) concentration of layered material. The effect of this approach can provide improved mechanical, thermal and/or electrical properties to the final material.

Further optional features of the invention are set out below.

BRIEF DESCRIPTION OF THE DRAWINGS

Embodiments of the invention will now be described by way of example with reference to the accompanying drawings in which:

FIG. 3(a) shows an SEM image of a pristine polymer particle not yet subjected to microfluidization.

FIGS. 3(b), 3(c), 3(d), 3(e) show SEM images of polymer particles after different numbers of microfluidization cycles.

FIGS. 4(a) and 4(b) shows SEM images of nylon-12 nanowires.

FIGS. 5(a) and 5(b) show SEM images of graphene/nylon-12 nanowire compound showing that the graphene is homogeneously dispersed.

FIG. 6(a) shows an SEM image of pristine nylon 12 powder.

FIG. 6(b) shows an SEM image of nylon nanowire after 20 microfluidization cycles.

FIG. 6(c) shows an SEM image of nylon nanowire after 100 microfluidization cycles.

DETAILED DESCRIPTION OF THE PREFERRED EMBODIMENTS, AND FURTHER OPTIONAL FEATURES OF THE INVENTION

In some preferred embodiments, there are disclosed scalable microfluidic routes to fabricate polymer nanowires. These methods allow the tuning of the size and properties of the produced nanowires in a controllable way. Moreover, we demonstrate some potential applications of the PNWs which, to the knowledge of the inventors, have not been shown before. It is considered that the present disclosure will trigger new research in the polymer nanowire field.

Figure 1:
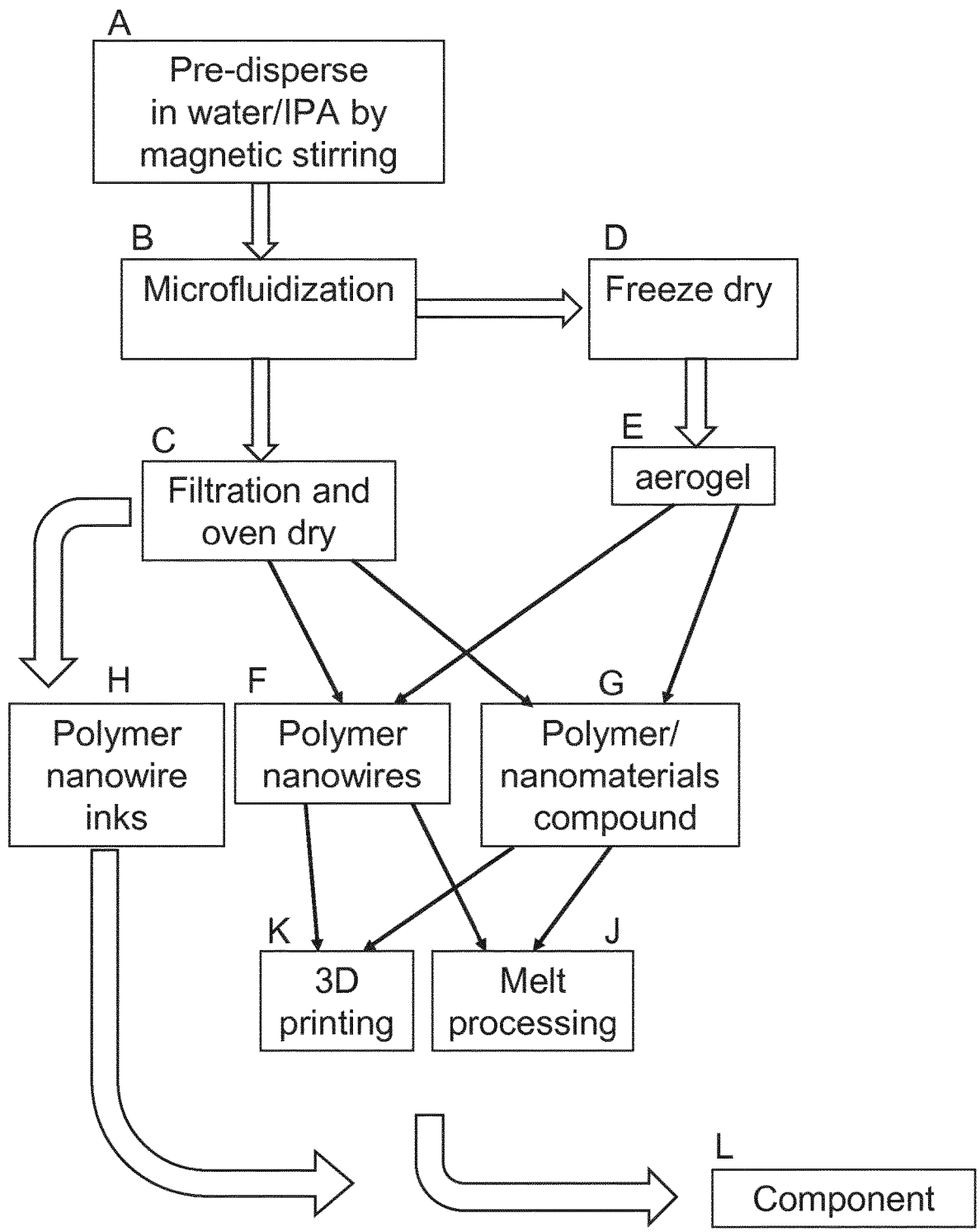
FIG. 1 shows a schematic flow diagram of suitable process for manufacturing products according to embodiments of the invention.

The process to fabricate polymer nanowires is shown schematically in FIG. 1. This is shown in the context of the production of either polymer nanowire or polymer/graphene compound. Polymer/graphene compounds are discussed later.

Briefly, in FIG. 1, it can be seen that in step A, the polymer powder is dispersed in water/isopropanol (IPA) by magnetic stirring. Then, in step B, the dispersion is subjected to microfluidization. This is described in more detail below. The microfluidized product can then be filtered and dried (step C) or freeze dried (step D). If freeze dried, the product becomes an aerogel (step E).

Thus, the product can either be polymer nanowire (also called nanofibre—step F) or polymer/graphene compound (step G). The product can be subjected to melt processing in step J (as is typical for thermoplastic materials) or may be subjected to 3D printing (step K) in order to manufacture a component at step L.

Figure 2:
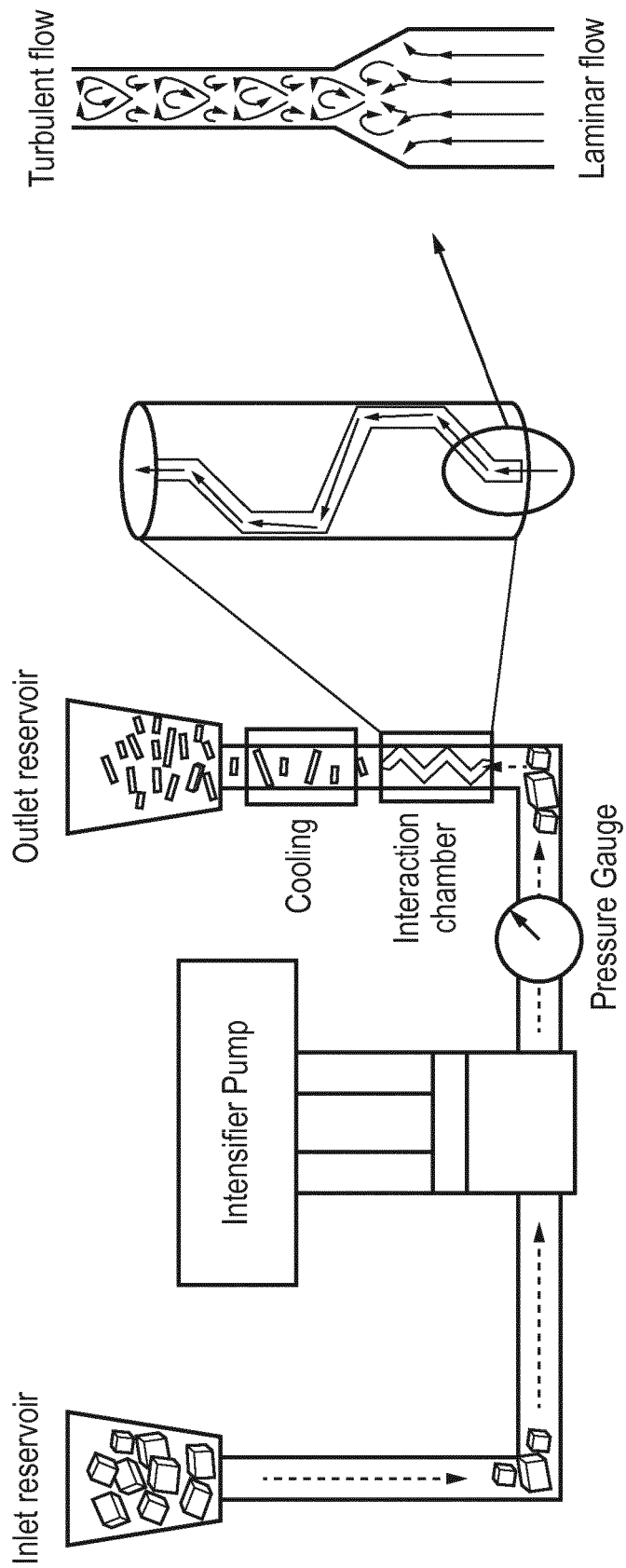
FIG. 2 shows a schematic arrangement of a microfluidizer for use in the present invention. The interaction chamber is shown in schematic enlarged view at two scales, the most enlarged scale indicating the transition from laminar flow to turbulent flow as the flow passage is restricted. The most enlarged scale view is taken from http://digilander.libero.it/mfinotes/IVEuropeo/fluido2/fluido2.html [accessed 22 Sep. 2017]
Figure 7:
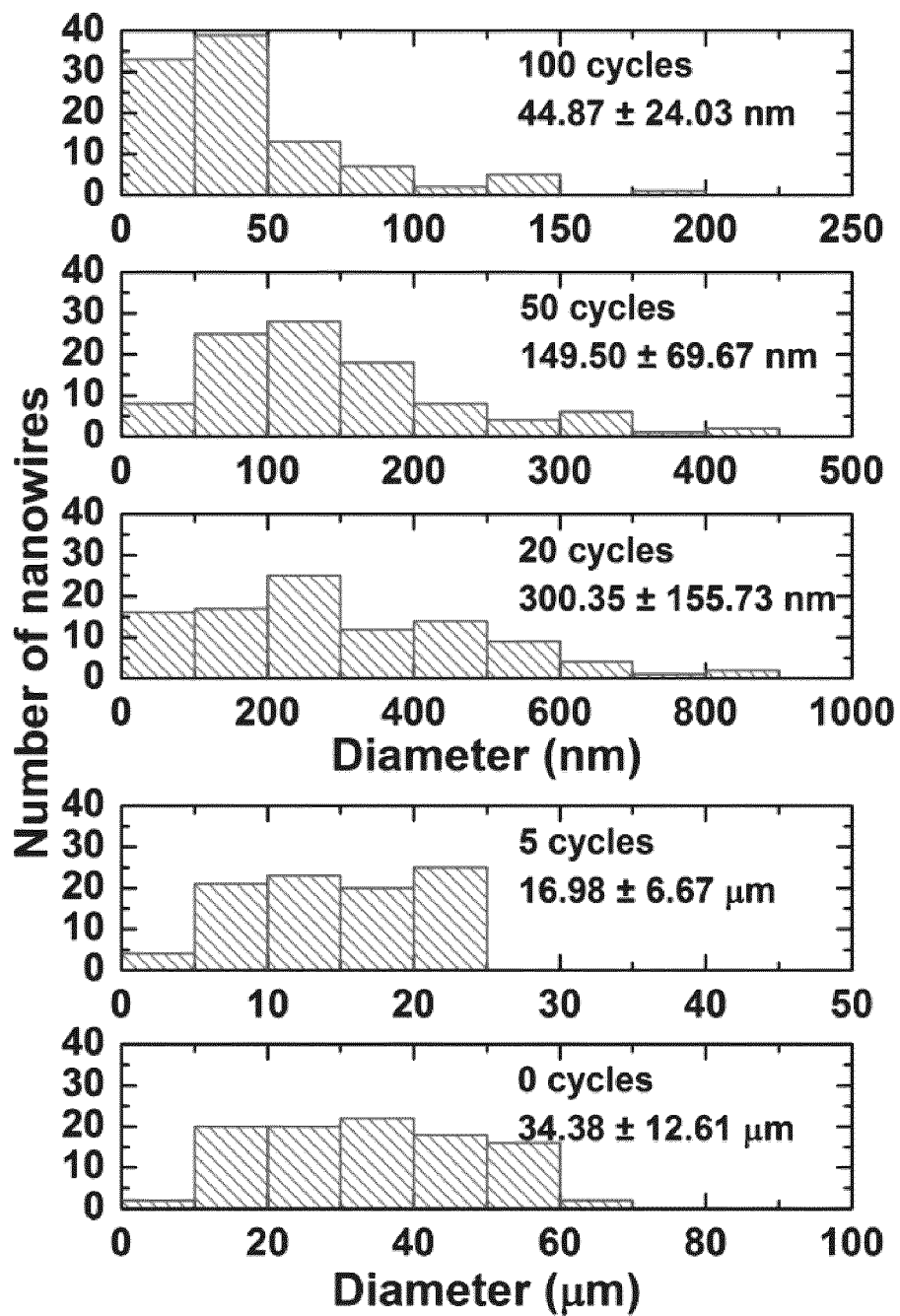
FIG. 7 shows histograms of diameter distribution from the starting polymer powder material and after 5, 20, 50 and 100 cycles.

In one example, DuraForm polyamide-12 (nylon-12) is used as a starting material. The average size of the nylon-12 powder is around 34 µm, which is suitable for flow in microchannels with a diameter of 87 µm. It should be noted that the powder size should be smaller than the microchannel diameter otherwise a blockage may happen. The fabrication of other polymer nanowires was also successfully demonstrated, such as polyethylene, PEEK and polyaniline. Other thermoplastic/thermoset polymers may be used. The polymer particles are pre-dispersed by magnetic stirring in water/IPA (FIG. 1 step A). The mixture is then microfluidized by using a microfluidic processor (M110-P, Microfluidics Inc.) with a Z-type geometry interaction chamber (e.g. G10Z) (see the schematic shown in FIG. 2). During microfluidization, the mixture was forced to pass through a microchannel (diameter, d<100 µm) by applying high pressure (up to 207 MPa). Here we use maximum pressure available from our system and various numbers of process cycles (1 to 100). One cycle means a complete pass through the interaction chamber. The key advantage of microfluidization is homogeneous application of high shear force across whole fluid. Subject to the applied shear force, the polymer particles dispersed in the fluid were stretched cycle by cycle, and finally the PNWs are yielded (FIGS. 3(a)-3(e)). Taking nylon-12 as an example, the original size of the particles are around 34 μm, which reduced to 45 nm after 100 cycles of microfluidization (FIGS. 3(a)-3(e)). The size of nylon nanowire can be controlled by controlling the microfluidization parameters, such as number of cycles (FIGS. 6(a), 6(b), 6(c) and 7) and pressure.

In the microfluidization process (at least when applied to exfoliation of nanoplates from graphite—see below), the Reynolds number Re indicates fully developed turbulent flow:

$$Re = \frac{\rho U D}{\mu} = 2.7 \times 10^4$$

The pressure losses inside the channel of the interaction chamber are estimated as:

$$\Delta p = \frac{fL\rho U^2}{2D} = 3.25 \times 10^7 \text{ Pa}$$

[See Ref. 14 which sets of full details of a corresponding microfluidization process.]

The energy dissipation inside the channel is given by $$\varepsilon = \frac{Q \Delta p}{\rho V} = 8.3 \times 10^9 \ m^2/s^3$$

The turbulent shear rate is given by $$\dot{\gamma} = \sqrt{\frac{\varepsilon}{\nu}} = 9.2 \times 10^7 \ s^{-1}$$

and in the present embodiment the turbulent shear rate is $>>10^4 \ s^{-1}$. [Paton et al (2014)]

As indicated in FIG. 3, in the present embodiment the Kolmogorov length is determined as:

$$\eta = \left(\frac{\nu^3}{\varepsilon}\right)^{1/4} \sim 103 \text{ nm}$$

Considering the two plate model for the determination of shear rate, in this model the shear rate is the speed drop across the gap, which can be obtained from the velocity v [m/s] and the plate separation y [m]:

$$\dot{\gamma} = \frac{dv}{dy}[s^{-1}]$$

In the formation of polymer nanowires, the particles are stretched due to the applied shear force when passing through the microfluidic channel The particle diameter is reduced by about 1000 times from about 34 μm to about 45 nm. Thus, the particles are converted to a fibrous shape. This is shown by considering the progression of the polymer particles of FIG. 3(a) (pristine particles) as the number of microfluidization cycles increases in progression from FIG. 3(b) to FIG. 3(c) to FIG. 3(d) to FIG. 3(e).

Figure 8:
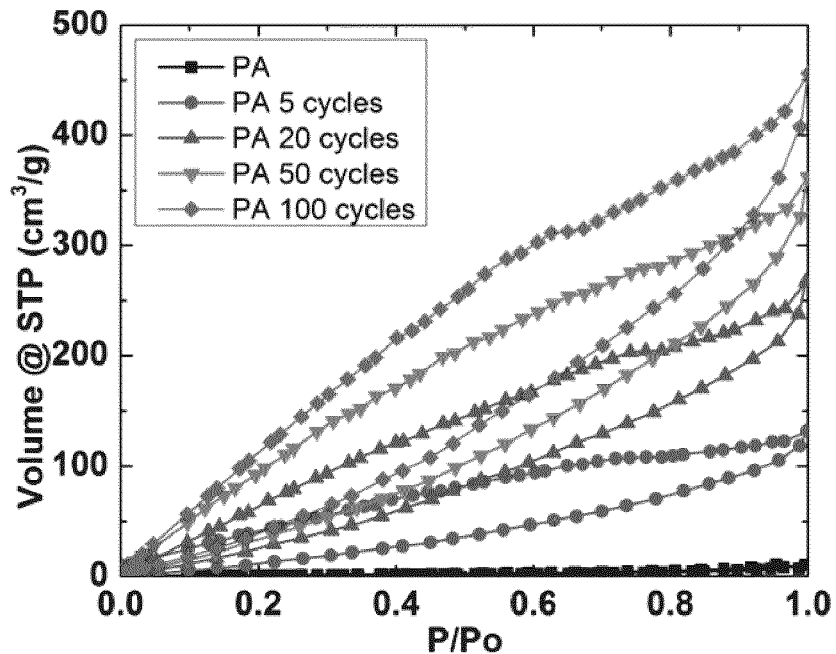
FIG. 8 shows nitrogen adsorption/desorption curve for pristine nylon-12 powders and nylon-12 nanowires.
Figure 9:
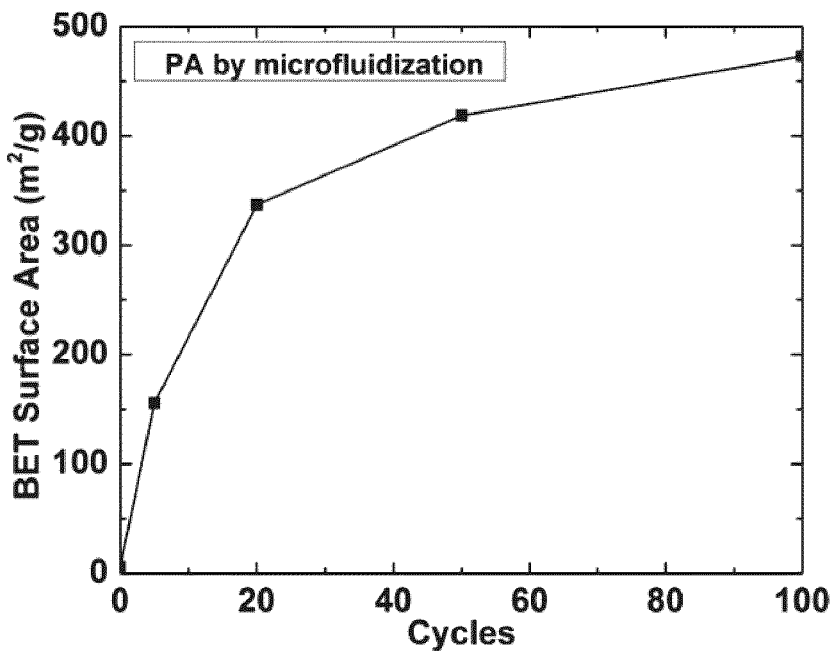
FIG. 9 shows BET surface area of pristine nylon-12 powders and nylon-12 nanowires plotted against the number of microfluidization cycles.

The mean surface area of the nylon nanowires are determined by nitrogen adsorption (FIGS. 8 and 9). The BET surface area significantly increased with the increasing cycles (FIG. 9). The BET surface area of pristine nylon-12 powders is about 6 $m^2/g$. With only 5 cycles of microfluidization, the BET surface area of the polymer nanowires became about 155 $m^2/g$, which increased to about 473 $m^2/g$ after 100 cycles.

Figure 10:
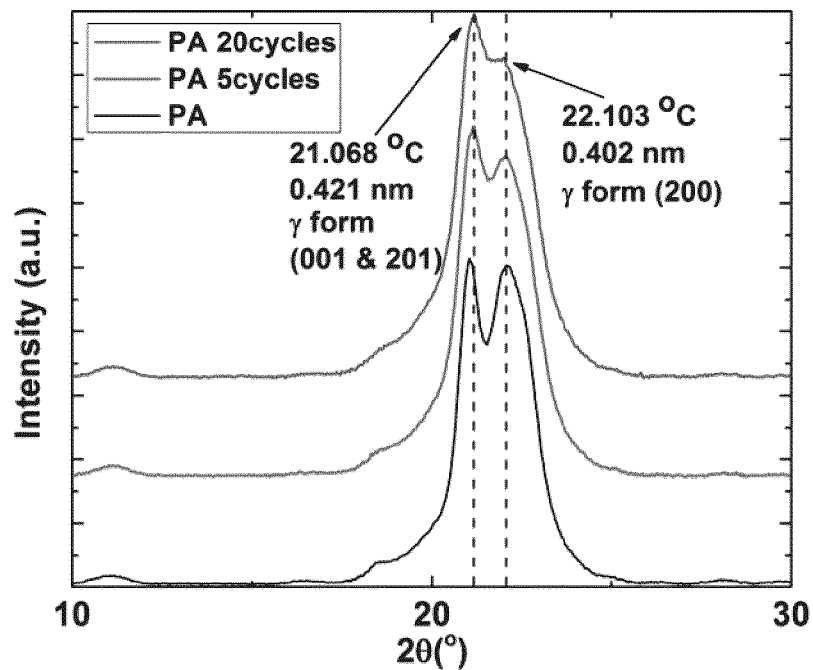
FIG. 10 shows XRD spectra of pristine nylon-12 powders and nylon-12 nanowires.

X-ray diffraction was applied to characterize the crystallization of nylon-12 nanowires. The pristine nylon-12 powders and nylon-12 nanowires exist as γ-form with two plane of [(001) and (201)] and (200) (FIG. 10 [Ref. 15]. The [(001) and (201)] plane has a spacing of 0.421 nm, while (200) has a spacing of 0.402 nm. It is clearly shown that the ratio of (200) plane to [(001) and (201)] plane decreased with the increasing number of cycles. This observation indicates that the microfluidization process alters the orientation of the nanowires.

Figure 11:
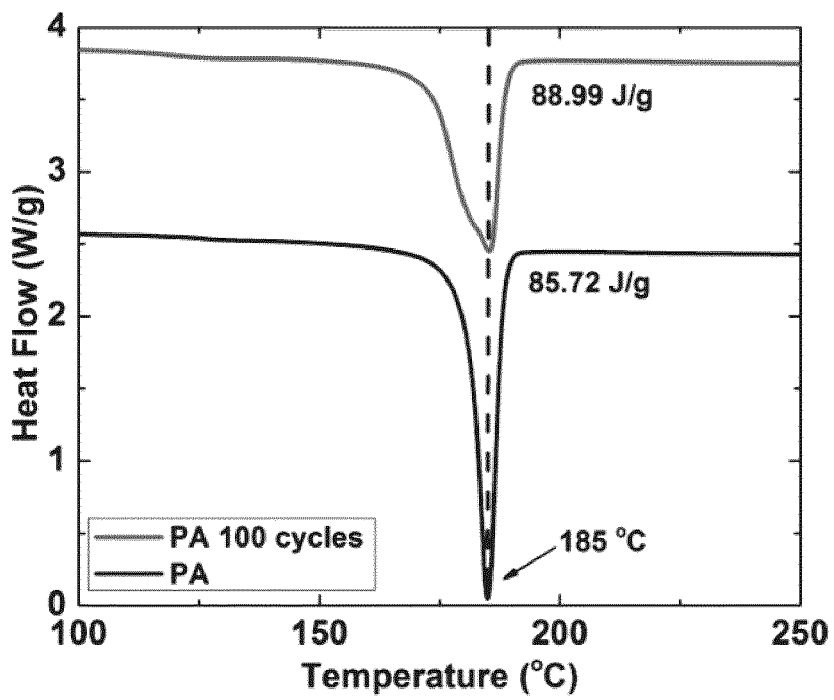
FIG. 11 shows DSC plots of pristine nylon-12 powders and nylon-12 nanowires.

Furthermore, the melting enthalpy of nylon-12 nanowires increased to 88.99 J/g, compared to 85.72 J/g for the pristine nylon-12 nanowires, as shown in FIG. 11. This observation indicated an increase in crystallinity.

Thus, the polymer nanowires produced by microfluidization have a higher degree of orientation and crystallinity compared to the starting material. The high orientation and crystallinity can result in superior performance in properties.

Figure 12:
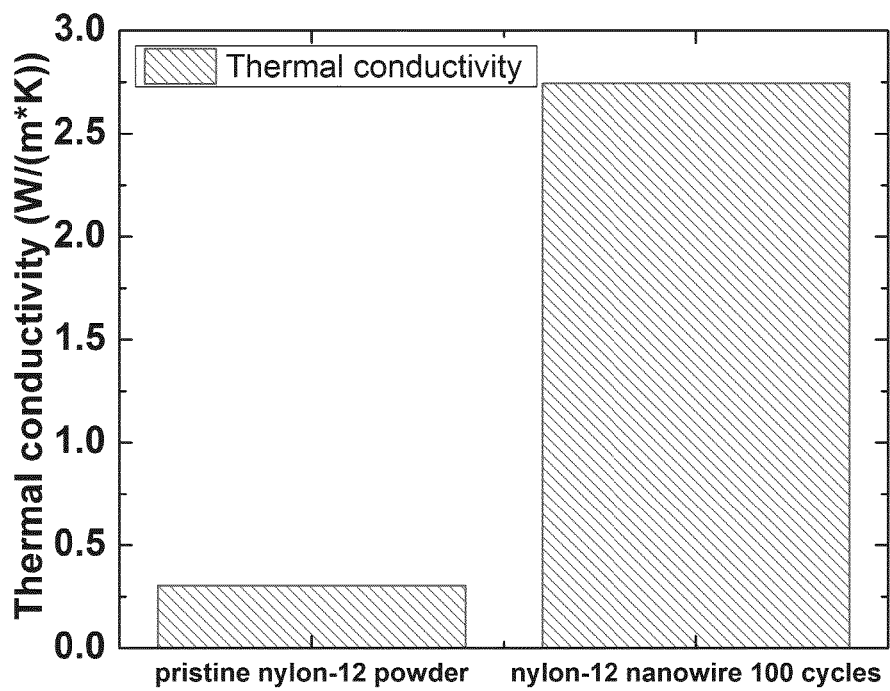
FIG. 12 compares the thermal conductivity of pristine nylon-12 powders and nylon-12 nanowires.

The thermal conductivity (κ) of the polymer nanowires was investigated by using a combination of modulated differential scanning calorimetry (MDSC) and the laser flash method. The polymer powders or nanowires are pressed into a film under a pressure of 10 bar and the thermal diffusivity of the film is measured. Thermal diffusivity (D) was determined by the laser flash method (NETZSCH LFA 467 Hyper Flash). The heat capacity ($C_p$) of the polymer powder/nanowire was measured using a TA Instruments DSC Q20 calorimeter in MDSC mode. The thermal conductivity was obtained from the relationship κ=$DC_p\rho$, where, ρ is density. After 100 cycles of microfluidization, the thermal conductivity of nylon-12 nanowires becomes 2.744 W/(m*K), which is a 900% increase compared to the pristine nylon-12 (0.304 W/(m*K)) (FIG. 12). The high thermal conductivity is considered to originate from the high orientation nature and the high crystallinity of the nanowires. It is, therefore, of interest to consider applications of the nanowires in the textiles industry, in order to enable smart textiles with much improved thermal management ability.

Graphene can be incorporated into a bulk matrix to produce nanocomposites for various applications, such as mechanical reinforcement [Ref. 16], and thermal management [Ref. 17]. In automotive thermal management applications, polymers such as polyamide (PA) are predominantly used (Dupont UK). For such applications, composites containing few-layer graphene (FLG) with aspect ratio (AR) larger than 100 were reported to perform better than those containing single-layer graphene (SLG) with comparable AR [Ref. 18]. Melt compounding using screw extrusion is the most common industrial route to prepare composites [Ref. 19]. However, poor dispersion [Refs. 20, 21] of graphene limits performance [Ref. 16] and applications [Ref. 17] even if pre-mixing techniques are applied. One key reason for the poor dispersion is the limited surface area of polymer particle/pellets (<5 $m^2/g$). Thus, there is significant mismatch between the surface of graphene (typical surface area >50 $m^2/g$) and exposed surface of polymer, which leads to aggregation of graphene. Here, we produce polymer nanowires/graphene compound by microfluidisation [Ref. 14], which later can be melt compressed into a composite with uniform dispersion of flakes. FLG with AR>500 and PA are pre-mixed by magnetic stirring in water/isopropanol. The mixture is then microfluidized to yield a FLG/PA dispersion, then filtered and oven dried to give a FLG/PA compound. The FLG is homogenously attached onto the surface of nylon-12 nanowires (FIGS. 5(a) and 5(b)). Compare this with the corresponding SEM images of nylon-12 nanowires without FLG (FIGS. 4(a) and 4(b)).

The FLG/PA compound was directly melt processed to produce a final composite. A thermal conductivity of about 1.3 $W/m^{-1}K^{-1}$ is achieved with 5 wt. % FLG, using four times less FLG compared to twin-screw extrusion (about 20 wt. %) (FIG. 13).

Figure 13:
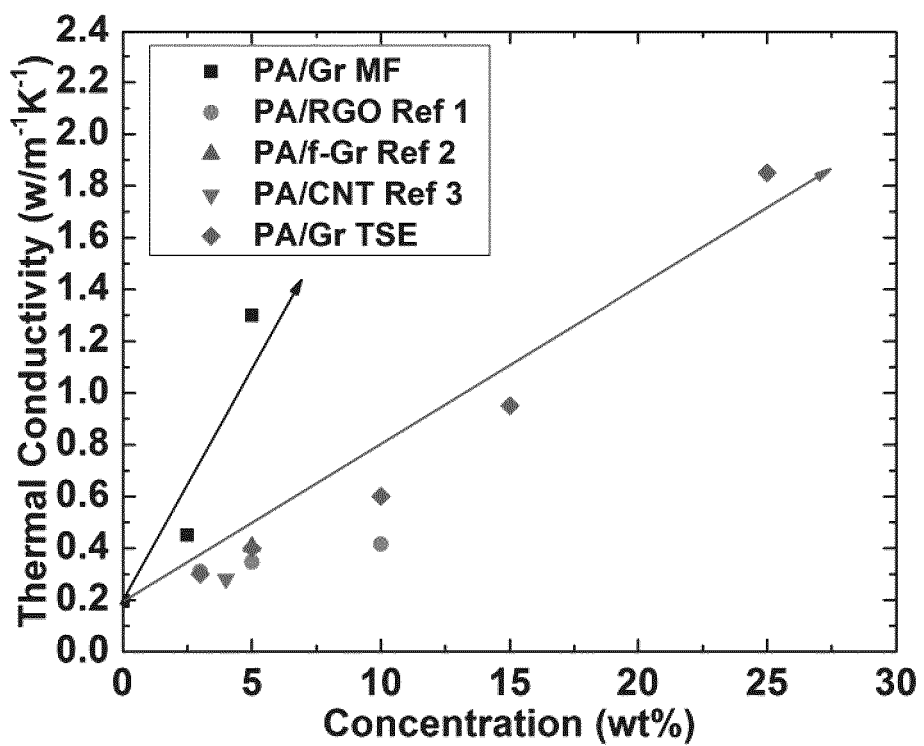
FIG. 13 shows thermal conductivity of nylon-12 composites processed by different methods.

Note that in FIG. 13, the abbreviations used are:
PA=polyamide, Gr=graphene, RGO=reduced graphene oxide, f-Gr=functionalised graphene, CNT=carbon nanotube, MF=microfluidisation, and TSE=twin screw extrusion.

The references listed in FIG. 13 (data for comparison to the example of the present invention) are:
[Ref. 1] N. Song et. al, Compos Part a-Appl S, 73 (2015) 232-241.
[Ref. 2] P. Ding et. al, Carbon, 66 (2014) 576-584.
[Ref. 3] Z. Q. Shen et. al., Compos Sci Technol, 69 (2009) 239-244.

Microfluidic processing can be used for masterbatch production. A masterbatch is an intermediate product containing high concentration (5 to 20 wt. %) of flakes [Ref. 19], which can later be diluted with polymer to produce the desired end-products. Current masterbatch production methodologies often require the introduction of surfactants [Refs. 22, 23] to aid graphene dispersion. However, they can have a negative impact on composite properties, such as increased interfacial resistance (i.e. reduced heat transfer) [Ref. 24]. Our microfluidic processing route is surfactant-free. This is additionally advantageous in applications where surfactants are prohibited, e.g. in bioapplications.

The present invention can be applied to many different thermoplastic or thermoset materials. These polymers can be standard, engineering, or high-performance polymers, semi-conducting polymers or biopolymers. For example, the present invention has been successfully applied to:
Polyamide (PA)
Ultra-high molecular weight polyethylene (UHMWPE)
Polyether ether ketone (PEEK)
Polyaniline (PANI)
poly(3,4-ethylenedioxythiophene) polystyrene sulfonate (PEDOT:PSS)

Figure 14:
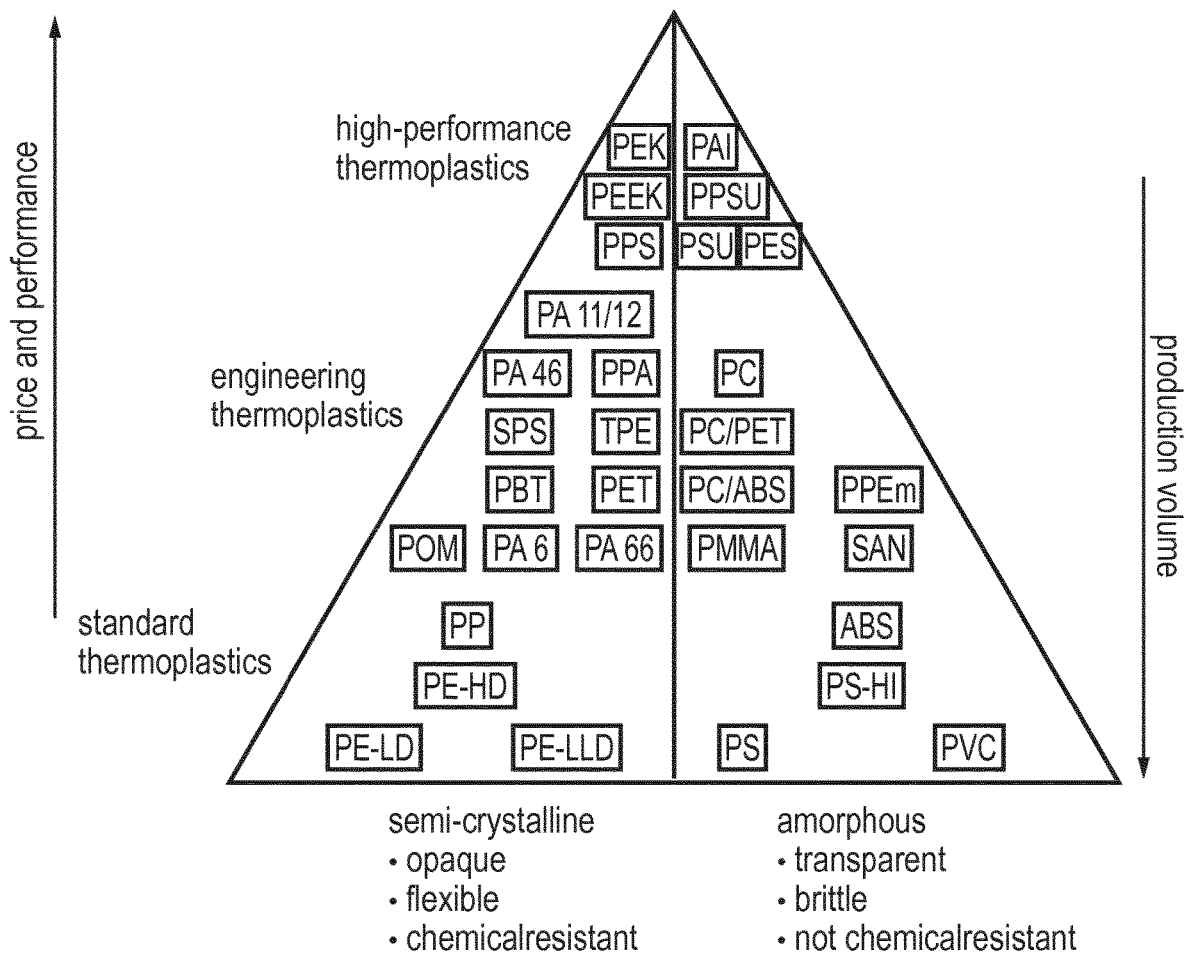
FIG. 14 shows various polymer compositions to which the present invention may be applied. This is taken from http://www.dupont.co.uk/products-and-services/plastics-polymers-resins/thermoplastics/products/zytel-htn.html [accessed 22 Sep. 2017].

It is considered that the present application can be applied to many different polymeric materials. In particular, any of the compositions indicated in FIG. 14 are suitable, and most particularly compositions on the left hand side of the diagram.

Of particular interest are high performance polyamides HPPA: PA 11, PA 12, PA 6T, PA 9T, PA 46, PARA, PPA, PA MXD6. These materials tend to have excellent mechanical properties, chemical resistance and high heat stability.

The materials produced in the present invention are considered to be of use for: Automotive thermal management components, in particular replacing metal components
Engineering applications: cooling system components (in particular replacing metal components)
Components in aerospace industries
3D printing
Masterbatch
High performance fiber filler PA12, which has been used in the illustrated examples of the present invention has particularly suitable characteristics:
High mechanical performance: traction and continuous or alternate flexion
High flexibility even at very low temperature
Very low water absorption
Excellent dimensional stability
Very good resistance to chemicals and weathering and very good hydrolysis resistance
Lowest density of all polyamides
High impact strength down to −40° C.
Biocompatibility
At present, the main applications of PA12 are:
Compressed air systems in car industry
Aeronautic components
Sanitary components (replace metallic parts)
Pipes: robotic, pneumatic, tools, industrial machinery, etc.
Sports and leisure goods
Housings for high quality electronic devices
Medical devices
Optical components
3D printing Embodiments of the present invention may therefore include:
Electrically conductive PA12 (compounded with a conductive material derived from a layered material, e.g. graphene) can be used in fuel systems
Thermal conductive PA12 can be used in cooling systems, heat exchangers etc.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

LIST OF NON-PATENT REFERENCES

1 Zhou, C., Zhang, Y., Li, Y. & Liu, J. Construction of high-capacitance 3D CoO@polypyrrole nanowire array electrode for aqueous asymmetric supercapacitor. Nano Lett 13, 2078-2085, doi:10.1021/nl400378j (2013).
2 Xin, H. et al. Polymer Nanowire/Fullerene Bulk Heterojunction Solar Cells: How Nanostructure Determines Photovoltaic Properties. Acs Nano 4, 1861-1872 (2010).
3 Chen, X. P., Wong, C. K. Y., Yuan, C. A. & Zhang, G. Q. Nanowire-based gas sensors. Sensor Actuat B-Chem 177, 178-195 (2013).
4 Chen, H. Y. et al. Nanowire-in-Microtube Structured Core/Shell Fibers via Multifluidic Coaxial Electrospinning. Langmuir 26, 11291-11296 (2010).
5 Min, S. Y. et al. Organic Nanowire Fabrication and Device Applications. Small 11, 45-62 (2015).
6 Martin, C. R. Nanomaterials—a Membrane-Based Synthetic Approach. Science 266, 1961-1966 (1994).
7 Liu, H. Q., Kameoka, J., Czaplewski, D. A. & Craighead, H. G. Polymeric nanowire chemical sensor. Nano Lett 4, 671-675 (2004).
8 Wang, K., Wu, H. P., Meng, Y. N. & Wei, Z. X. Conducting Polymer Nanowire Arrays for High Performance Supercapacitors. Small 10, 14-31 (2014).

9 Min, S. Y. et al. Large-scale organic nanowire lithography and electronics. Nat Commun 4 (2013).

10 Choi, W., An, T. & Lim, G. in Nanowires—Implementations and Applications (ed Abbass Hashim) Ch. 19 (InTech, 2011).

11 Lajunen, T. et al. Topical drug delivery to retinal pigment epithelium with microfluidizer produced small liposomes. Eur J Pharm Sci 62, 23-32 (2014).

12 Jafari, S. M., He, Y. H. & Bhandari, B. Production of sub-micron emulsions by ultrasound and microfluidization techniques. J Food Eng 82, 478-488 (2007).

13 Panagiotou, T., Bernard, J. M. & Mesite, S. V. Deagglomeration and Dispersion of Carbon Nanotubes Using Microfluidizer (R) High Shear Fluid Processors. Nsti Nanotech 2008, Vol 1, Technical Proceedings, 39–+ (2008).

14 Karagiannidis, P. G. et al. Microfluidization of Graphite and Formulation of Graphene-Based Conductive Inks. Acs Nano 11, 2742-2755 (2017).

15 Ishikawa, T., Nagai, S. & Kasai, N. The Gamma-]Alpha-Partial Transformation in Nylon-12 by Drawing. Makromol Chem 182, 977-988 (1981).

16 Young, R. J., Kinloch, I. A., Gong, L. & Novoselov, K. S. The mechanics of graphene nanocomposites: A review. Compos Sci Technol 72, 1459-1476 (2012).

17 Ferrari, A. C. et al. Science and technology roadmap for graphene, related two-dimensional crystals, and hybrid systems. Nanoscale 7, 4598-4810 (2015).

18 Shen, X. et al. Multilayer Graphene Enables Higher Efficiency in Improving Thermal Conductivities of Graphene/Epoxy Composites. Nano Lett 16, 3585-3593 (2016).

19 Bao, C. L. et al. Preparation of graphene by pressurized oxidation and multiplex reduction and its polymer nanocomposites by masterbatch-based melt blending. J Mater Chem 22, 6088-6096 (2012).

20 Verdejo, R., Bernal, M. M., Romasanta, L. J. & Lopez-Manchado, M. A. Graphene filled polymer nanocomposites. J Mater Chem 21, 3301-3310 (2011).

21 Kim, H. et al. Graphene/polyethylene nanocomposites: Effect of polyethylene functionalization and blending methods. Polymer 52, 1837-1846 (2011).

22 Shi, Y., Peterson, S. & Sogah, D. Y. Surfactant-free method for the synthesis of poly(vinyl acetate) masterbatch nanocomposites as a route to ethylene vinyl acetate/silicate nanocomposites. Chem Mater 19, 1552-1564 (2007).

23 Wan, Y. J. et al. Improved dispersion and interface in the graphene/epoxy composites via a facile surfactant-assisted process. Compos Sci Technol 82, 60-68 (2013).

24 Bryning, M. B., Milkie, D. E., Islam, M. F., Kikkawa, J. M. & Yodh, A. G. Thermal conductivity and interfacial resistance in single-wall carbon nanotube epoxy composites. Appl Phys Lett 87 (2005).

Bianco, et al, All in the graphene family A recommended nomenclature for two-dimensional carbon materials, Carbon 65 (2013) 1-6.

Launder and Spalding, The numerical computation of turbulent flows, COMPUTER METHODS IN APPLIED MECHANICS ANR ENGINEERING 3 (1974) 269-289.Li, W.-H. Zhong, Review on polymer/graphite nanoplatelet nanocomposites, J Mater Sci 46 (2011) 5595-5614.

Paton, E. Varrla, C. Backes, R. J. Smith, U. Khan, A. O'Neill, C. Boland, M. Lotya, O. M. Istrate, P. King, T. Higgins, S. Barwich, P. May, P. Puczkarski, I. Ahmed, M. Moebius, H. Pettersson, E. Long, J. Coelho, S. E. O'Brien, E. K. McGuire, B. M. Sanchez, G. S. Duesberg, N. McEvoy, T. J. Pennycook, C. Downing, A. Crossley, V. Nicolosi & J. N. Coleman, Scalable production of large quantities of defect-free few-layer graphene by shear exfoliation in liquids, Nature Materials 13 (2014) 624-630.

Chakraborty "Physics and modeling of turbulent transport", Chapter 18, pages 749-833, in MICROFLUIDICS AND NANOFLUIDICS HANDBOOK—CHEMISTRY, PHYSICS AND LIFE SCIENCE PRINCIPLES, edited by S. K. Mitra and S. Chakraborty, CRC Press, Taylor & Francis Group, (2012)

Jafari, et al., Production of sub-micron emulsions by ultrasound and microuidization techniques, Journal of Food Engineering 82 (2007) 478-488.

The invention claimed is:

1. A method for treating polymer particles, the method including providing polymer particles and providing a carrier liquid, the method further including the steps:
   (a) mixing said polymer particles with said carrier liquid to form a dispersion of said particles in said carrier liquid at a concentration of at least 0.1 g/L, based on the volume of the dispersion; and
   (b) subjecting the dispersion to microfluidization treatment thereby causing particle stretching, particle size reduction and increasing the surface area per unit mass of the polymer particles.

2. The method according to claim 1 wherein the microfluidization treatment of step (b) comprises
   (b(i)) pressurizing the dispersion to a pressure of at least 10 kpsi; and
   (b(ii)) forcing the dispersion along a microfluidic channel under said pressure, to apply a shear rate of at least $10^5$ $s^{-1}$ to said particles in the dispersion, thereby causing particle stretching, particle size reduction and increasing the surface area per unit mass of the polymer particles.

3. The method according to claim 1 further including the step of adding particles of a layered material to the dispersion, the microfluidization treatment causing exfoliation of nanoplates from said particles.

4. The method according to claim 1 further including the step of adding nanoplates derived from a layered material to the dispersion.

5. The method according to claim 4 wherein the nanoplates are added to the dispersion before step (b).

6. The method according to claim 4 wherein the nanoplates are added to the dispersion after step (b).

7. The method according to claim 1 wherein the nanoplates are selected from one or more of elemental materials such as graphene (typically derived from pristine graphite), metals (e.g., $NiTe_2$, $VSe_2$), semi-metals (e.g., $WTe_2$, $TcS_2$), semiconductors (e.g., $WS_2$, $WSe_2$, $MoS_2$, $MoTe_2$, $TaS_2$, $RhTe_2$, $PdTe_2$), insulators (e.g., h-BN, $HfS_2$), superconductors (e.g., $NbS_2$, $NbSe_2$, $NbTe_2$, $TaSe_2$) and topological insulators and thermo-electrics (e.g., $Bi_2Se_3$, $Bi_2Te_3$).

8. The method according to claim 1 wherein the layered material is graphite and the nanoplates are graphite nanoplates.

9. The method according to claim 1 wherein the layered material is pristine graphite and the nanoplates are graphite nanoplates.

10. The method according to claim 2, wherein the dispersion subjected to step (b) is subjected to steps (b(i)) and (b(ii)) repeatedly, either via the same or different microfluidic channels, according to a number of cycles, wherein the number of cycles is at least 2.

11. The method according to claim 10 wherein the particles of a layered material are added after at least one cycle of steps (b(i)) and (b(ii)).

12. The method according to claim 11 wherein the dispersion including the nanoplates is subjected to at least one further cycle of steps (b(i)) and (b(ii)).

13. The method according to claim 1 further including the step of removing the carrier liquid, to manufacture a composition comprising polymer particles mixed with nanoplates derived from a layered material.

14. A particulate composition comprising polymer particles mixed with nanoplates derived from a layered material, wherein the particulate composition has a BET surface area of at least 80 $m^2/g$ and the polymer particles have an aspect ratio defined as length/thickness of greater than 10.

15. The particulate composition according to claim 14 wherein the nanoplates are present in an amount of at least 0.1 wt % based on the mass of the particulate composition.

16. A method for the manufacture of a component formed of a composite of a polymer with a dispersion of nanoplates, the method including the steps:
provic ling a particulate composition as a precursor particulate, the precursor particulate comprising polymer particles mixed with nanoplates derived from a layered material, wherein the particulate composition has a BET surface area of at least 80 $m^2/g$ and the polymer particles have an aspect ratio defined as length/thickness of greater than 10; and
forming the precursor particulate into the component.

17. The method according to claim 16, further including mixing the particulate composition with further polymer particles to form the precursor particulate.

* * * * *